United States Patent
Kufrovich et al.

[19]

[11] Patent Number: 6,024,475
[45] Date of Patent: Feb. 15, 2000

[54] LIGHTING CONDUIT SYSTEM

[76] Inventors: Robert K. Kufrovich; Michelle K. Kufrovich, both of 1727 W. North St., Bethlehem, Pa. 18018

[21] Appl. No.: 09/168,109

[22] Filed: Oct. 8, 1998

[51] Int. Cl.[7] ............................. F21V 21/28; F21V 17/02; F21S 1/02

[52] U.S. Cl. .............................. 362/576; 362/1; 362/552; 362/145; 362/557; 362/281; 362/323; 362/324

[58] Field of Search ............................... 362/1, 576, 557, 362/560, 522, 551, 145, 224, 281, 282, 284, 323, 324; 359/595; 250/214 L

[56] References Cited

U.S. PATENT DOCUMENTS

| | | | |
|---|---|---|---|
| 4,246,477 | 1/1981 | Latter | 250/214 |
| 5,540,216 | 7/1996 | Rasmusson | 362/557 |
| 5,548,490 | 8/1996 | Smith et al. | 362/557 |

*Primary Examiner*—Cassandra Spyrou
*Assistant Examiner*—Fayez Assaf

[57] ABSTRACT

A lighting conduit system for collecting sunlight and distributing it inside a building structure to provide natural lighting to the inside of the building structure. The lighting conduit system includes a plurality of interconnected elongate tubular conduits adapted for mounting inside a building structure. Each of the conduits has a lumen in communication with the lumens of the other conduits to permit passage of light between the lumens of the conduits. The conduits include a plurality of fixture conduits each comprising spaced apart and generally concentric inner and outer sleeves each having upper and lower portions. The lower portions of the inner and outer sleeves each comprise a translucent material to permit passage of light in the lumen of the respective conduit through the lower portions of the inner and outer sleeves. The conduits also include a terminal conduit with an outer end adapted for extending outside of the building structure. A parabolic reflecting dish is rotatably mounted to the outer end of the terminal conduit. The reflecting dish has a parabolic concave light reflecting surface for reflecting sunlight to a focal point. A top reflector is supported above the light reflecting surface of the reflecting dish. The reflecting dish has an opening therethrough into the outer end of the terminal conduit at the center portion to permit light reflected by a light reflecting surface of the top reflector to pass into the lumen the terminal conduit.

12 Claims, 4 Drawing Sheets

LIGHTING CONDUIT SYSTEM

BACKGROUND OF THE INVENTION

1. Field of the Invention

The present invention relates to lighting systems and more particularly pertains to a new lighting conduit system for collecting sunlight and distributing it inside a building structure to provide natural lighting to the inside of the building structure.

2. Description of the Prior Art

The use of lighting systems is known in the prior art. More specifically, lighting systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,548,490; U.S. Pat. No. 4,471,412; U.S. Pat. No. 5,219,217; U.S. Pat. No. 4,306,796; U.S. Pat. No. 4,246,477; and U.S. Pat. No. 4,539,625.

While these devices fulfill their respective, particular objectives and requirements, the aforementioned patents do not disclose a new lighting conduit system. The inventive device includes a plurality of interconnected elongate tubular conduits adapted for mounting inside a building structure. Each of the conduits has a lumen in communication with the lumens of the other conduits to permit passage of light between the lumens of the conduits. The conduits include a plurality of fixture conduits each comprising spaced apart and generally concentric inner and outer sleeves each having upper and lower portions. The lower portions of the inner and outer sleeves each comprise a translucent material to permit passage of light in the lumen of the respective conduit through the lower portions of the inner and outer sleeves. The conduits also include a terminal conduit with an outer end adapted for extending outside of the building structure. A parabolic reflecting dish is rotatably mounted to the outer end of the terminal conduit. The reflecting dish has a parabolic concave light reflecting surface for reflecting sunlight to a focal point. A top reflector is supported above the light reflecting surface of the reflecting dish. The top reflector has a concave light reflecting surface facing the light reflecting surface of the reflecting dish. The light reflecting surface of the top reflector is located at the focal point for reflecting light towards a center point on the light reflecting surface of the reflecting dish. The reflecting dish has an opening therethrough into the outer end of the terminal conduit at the center portion to permit light reflected by the light reflecting surface of the top reflector to pass into the lumen the terminal conduit.

In these respects, the lighting conduit system according to the present invention substantially departs from the conventional concepts and designs of the prior art, and in so doing provides an apparatus primarily developed for the purpose of collecting sunlight and distributing it inside a building structure to provide natural lighting to the inside of the building structure.

SUMMARY OF THE INVENTION

In view of the foregoing disadvantages inherent in the known types of lighting systems now present in the prior art, the present invention provides a new lighting conduit system construction wherein the same can be utilized for collecting sunlight and distributing it inside a building structure to provide natural lighting to the inside of the building structure.

The general purpose of the present invention, which will be described subsequently in greater detail, is to provide a new lighting conduit system apparatus and method which has many of the advantages of the lighting systems mentioned heretofore and many novel features that result in a new lighting conduit system which is not anticipated, rendered obvious, suggested, or even implied by any of the prior art lighting systems, either alone or in any combination thereof.

To attain this, the present invention generally comprises a plurality of interconnected elongate tubular conduits adapted for mounting inside a building structure. Each of the conduits has a lumen in communication with the lumens of the other conduits to permit passage of light between the lumens of the conduits. The conduits include a plurality of fixture conduits each comprising spaced apart and generally concentric inner and outer sleeves each having upper and lower portions. The lower portions of the inner and outer sleeves each comprise a translucent material to permit passage of light in the lumen of the respective conduit through the lower portions of the inner and outer sleeves. The conduits also include a terminal conduit with an outer end adapted for extending outside of the building structure. A parabolic reflecting dish is rotatably mounted to the outer end of the terminal conduit. The reflecting dish has a parabolic concave light reflecting surface for reflecting sunlight to a focal point. A top reflector is supported above the light reflecting surface of the reflecting dish. The top reflector has a concave light reflecting surface facing the light reflecting surface of the reflecting dish. The light reflecting surface of the top reflector is located at the focal point for reflecting light towards a center point on the light reflecting surface of the reflecting dish. The reflecting dish has an opening therethrough into the outer end of the terminal conduit at the center portion to permit light reflected by the light reflecting surface of the top reflector to pass into the lumen the terminal conduit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new lighting conduit system apparatus and method which has many of the advantages of the lighting systems mentioned heretofore and many novel features that result in a new lighting conduit system which is not anticipated, rendered obvious, suggested, or even implied by any of the prior art lighting systems, either alone or in any combination thereof.

It is another object of the present invention to provide a new lighting conduit system which may be easily and efficiently manufactured and marketed.

It is a further object of the present invention to provide a new lighting conduit system which is of a durable and reliable construction.

An even further object of the present invention is to provide a new lighting conduit system which is susceptible of a low cost of manufacture with regard to both materials and labor, and which accordingly is then susceptible of low prices of sale to the consuming public, thereby making such lighting conduit system economically available to the buying public.

Still yet another object of the present invention is to provide a new lighting conduit system which provides in the apparatuses and methods of the prior art some of the advantages thereof, while simultaneously overcoming some of the disadvantages normally associated therewith.

Still another object of the present invention is to provide a new lighting conduit system for collecting sunlight and distributing it inside a building structure to provide natural lighting to the inside of the building structure.

Yet another object of the present invention is to provide a new lighting conduit system which includes a plurality of interconnected elongate tubular conduits adapted for mounting inside a building structure. Each of the conduits has a lumen in communication with the lumens of the other conduits to permit passage of light between the lumens of the conduits. The conduits include a plurality of fixture conduits each comprising spaced apart and generally concentric inner and outer sleeves each having upper and lower portions. The lower portions of the inner and outer sleeves each comprise a translucent material to permit passage of light in the lumen of the respective conduit through the lower portions of the inner and outer sleeves. The conduits also include a terminal conduit with an outer end adapted for extending outside of the building structure. A parabolic reflecting dish is rotatably mounted to the outer end of the terminal conduit. The reflecting dish has a parabolic concave light reflecting surface for reflecting sunlight to a focal point. A top reflector is supported above the light reflecting surface of the reflecting dish. The top reflector has a concave light reflecting surface facing the light reflecting surface of the reflecting dish. The light reflecting surface of the top reflector is located at the focal point for reflecting light towards a center point on the light reflecting surface of the reflecting dish. The reflecting dish has an opening therethrough into the outer end of the terminal conduit at the center portion to permit light reflected by the light reflecting surface of the top reflector to pass into the lumen the terminal conduit.

Still yet another object of the present invention is to provide a new lighting conduit system that provides natural lighting to rooms that do not have windows to permit exposure therein of sunlight.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 9 thereof, a new lighting conduit system embodying the principles and concepts of the present invention and generally designated by the reference numeral 10 will be described.

As best illustrated in FIGS. 1 through 9, the lighting conduit system 10 generally comprises a plurality of interconnected elongate tubular conduits 11 adapted for mounting inside a building structure 1. Each of the conduits has a lumen 12 in communication with the lumens of the other conduits to permit passage of light between the lumens of the conduits. The conduits include a plurality of fixture conduits 14 each comprising spaced apart and generally concentric inner and outer sleeves 15,16 each having upper and lower portions 17,18. The lower portions of the inner and outer sleeves each comprise a translucent material to permit passage of light in the lumen of the respective conduit through the lower portions of the inner and outer sleeves. The conduits also include a terminal conduit 33 with an outer end 34 adapted for extending outside of the building structure. A parabolic reflecting dish 35 is rotatably mounted to the outer end of the terminal conduit. The reflecting dish has a parabolic concave light reflecting surface 38 for reflecting sunlight to a focal point. A top reflector 39 is supported above the light reflecting surface of the reflecting dish. The top reflector has a concave light reflecting surface 41 facing the light reflecting surface of the reflecting dish. The light reflecting surface of the top reflector is located at the focal point for reflecting light towards a center point on the light reflecting surface of the reflecting dish. The reflecting dish has an opening 42 therethrough into the outer end of the terminal conduit at the center portion to permit light reflected by the light reflecting surface of the top reflector to pass into the lumen the terminal conduit.

In use, lighting system 10 is designed for providing lighting in a building structure 1. In closer detail, the lighting system 10 comprises a plurality of interconnected elongate tubular conduits 11 adapted for mounting inside a building structure 1 in locations suitable for light sources. Each of the conduits has a lumen 12 in communication with the lumens of the other conduits to permit passage of light between the lumens of the conduits. Each conduit has a longitudinal axis and a generally circular transverse cross section generally perpendicular to the longitudinal axis of the respective fixture conduit. Each of the conduits has a pair of opposite open ends proving openings into the lumen of the respective conduit. Each end of a conduit is coupled to an adjacent end of an adjacent conduit to permit passage of light through or between the lumens of the interconnected conduits. Each of the conduits has a light reflecting inner surface 13 defining the lumen of the respective conduit to insure that light passing through the lumens is not absorbed by the inner surface of the conduits.

Figure 1:
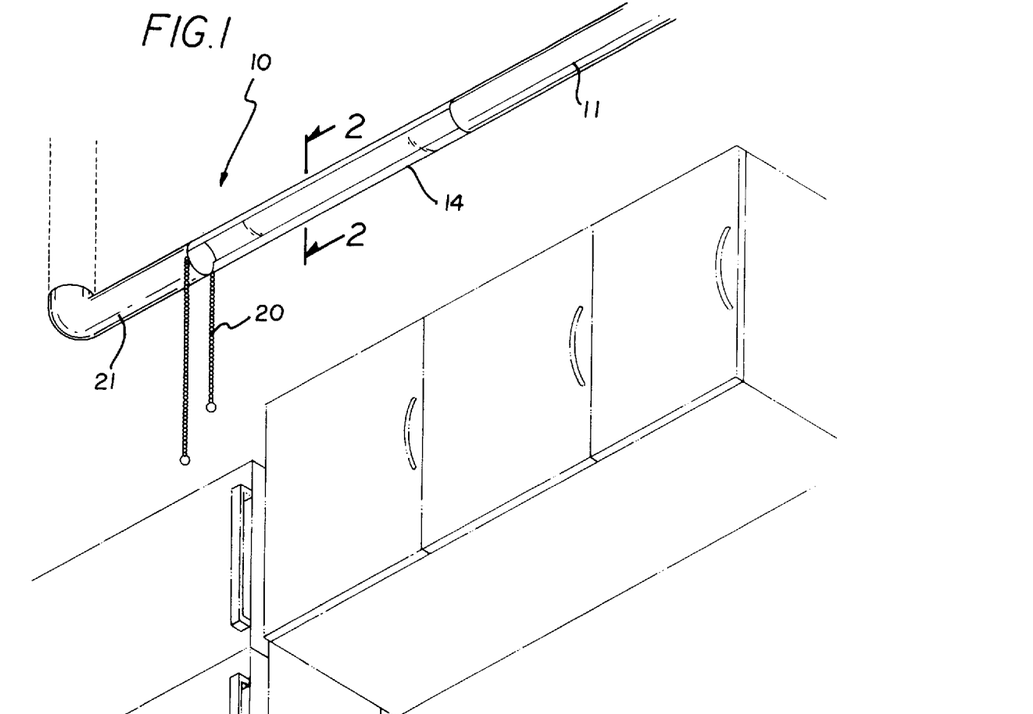
FIG. 1 is a schematic perspective view of a portion of a new lighting conduit system in a building structure according to the present invention.
Figure 2:
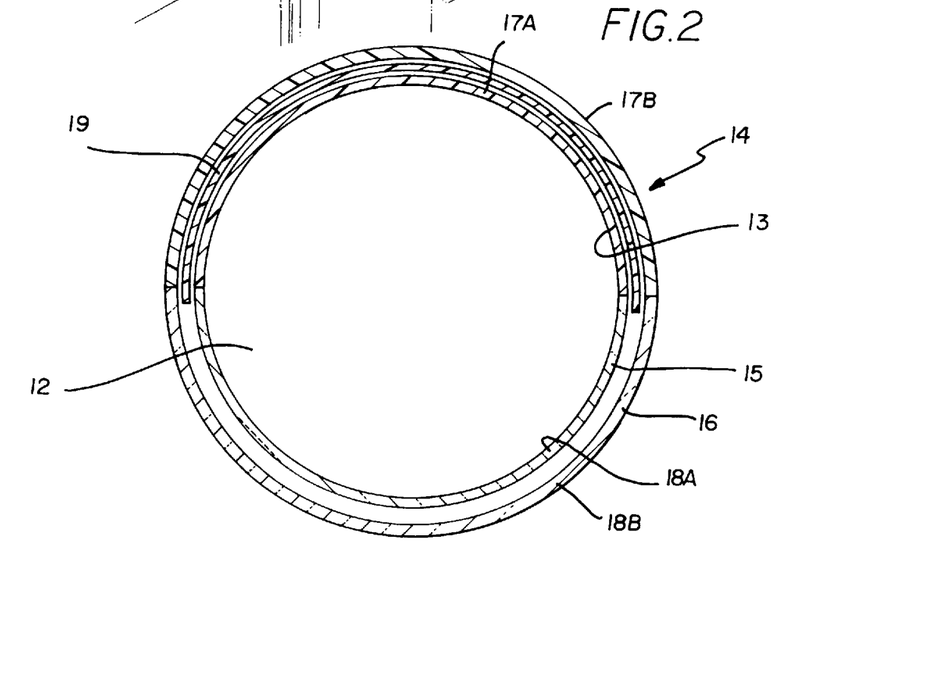
FIG. 2 is a schematic cross sectional view of a fixture conduit of the present invention taken from line 2—2 of FIG. 1.

With reference to FIG. 2, the conduits include a plurality of fixture conduits 14 adapted for positioning in the building structure where the user would like the light to be directed. Each of the fixture conduits comprises spaced apart and generally concentric inner and outer sleeves 15,16. The inner sleeve of each fixture conduit define the lumen of the fixture conduit. Each of the fixture conduits has a pair of opposite open ends providing openings into the lumen of the respective fixture conduit. The inner and outer sleeves of each of the fixture conduits each have upper and lower portions 17a,17b,18a,18b. The upper and lower portions of the inner and outer sleeves each have a generally semi-circular transverse cross section generally perpendicular to the associated longitudinal axis of the respective fixture conduit. The upper portion of the inner sleeve includes the light reflective inner surface for reflecting light in the lumen of the respective fixture conduit towards the lower portion of the inner sleeve. The lower portions of the inner and outer sleeves each comprise a translucent material to permit passage of light in the lumen of the respective conduit through the lower portions of the inner and outer sleeves. Ideally, the lower portions of the inner and outer sleeves each comprise a generally transparent material.

Each of the fixture conduits preferably has a shade portion 19 provided between the upper and lower portions of the respective fixture conduit. The shade portion has a generally semi-circular transverse cross section generally perpendicular to the longitudinal axis of the respective fixture conduit. In use, the shade portion is positionable between an open position and a closed position. In use, the shade portion is positioned between the upper portions of the inner and outer sleeves when the shade portion is in the open position to permit passage of light from the lumen of the respective fixture portion through the translucent lower portions of the inner and outer sleeves. When the shade portion is in the closed position, the shade portion is positioned between the lower portions of the inner and outer sleeves to substantially block passage of light from the lumen of the respective fixture portion through the translucent lower portions of the inner and outer sleeves. Ideally, each fixture conduit has a pull chain 20 coupled to the shade portion and downwardly depending from the respective fixture conduit. The pull chain permits positioning of the shade portion between the open and closed positions.

Figure 6:
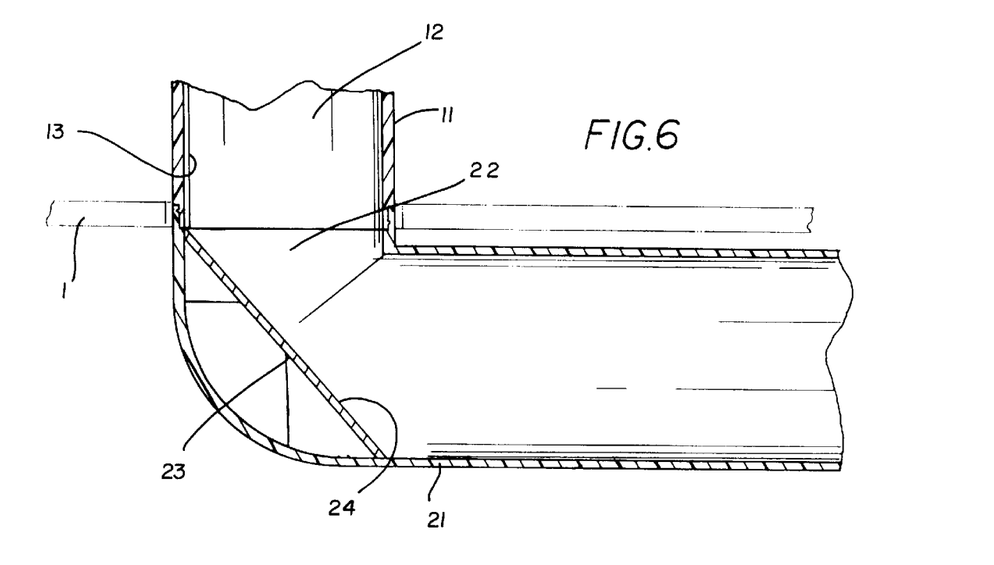
FIG. 6 is a schematic cross sectional view of an elbow conduit of the present invention.

With reference to FIG. 6, the conduits also include at least one elbow conduit 21. The elbow conduit has an opening 22 at an end of the elbow conduit generally lying in a plane generally parallel to the longitudinal axis of the elbow conduit. The elbow conduit is designed for changing the direction of the conduits by 90 degrees. The opening of the elbow conduit is connectable to an end of an adjacent conduit to permit passage of light between the lumens of the adjacent conduit and the elbow conduit. The elbow conduit preferably includes a mirror reflector 23 adjacent the opening of the elbow conduit. The mirror reflector has a light reflecting surface 24 facing into the lumen of the elbow conduit the mirror reflector generally lying in a plane extending at an acute angle to the longitudinal axis of the elbow conduit. Ideally, the acute angle of the mirror reflector is about 45 degrees. In use, the mirror reflector reflects light passing through the opening of the elbow conduit through the lumen of the elbow conduit.

Figure 7:
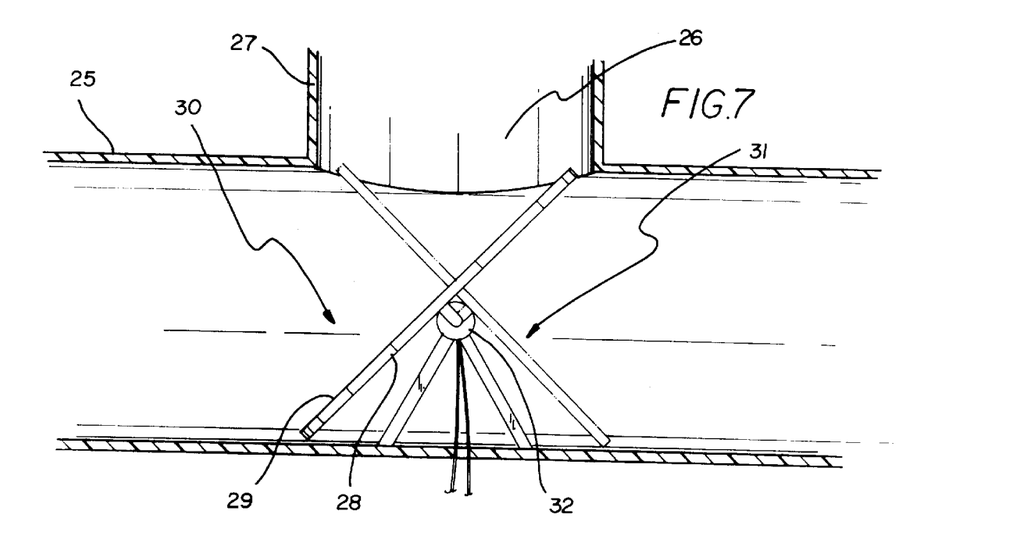
FIG. 7 is a schematic cross sectional view of a T-shaped conduit of the present invention.

With reference to FIG. 7, the conduits also preferably includes at least one T-shaped conduit 25 has an opening 26 between the pair of opposite ends of the T-shaped conduit. The opening of the T-shaped conduit generally lies in a plane parallel to the longitudinal axis of the T-shaped conduit. The T-shaped conduit has a generally cylindrical portion 27 outwardly extending from the opening of the T-shaped conduit. The cylindrical portion of the T-shaped conduit has a longitudinal axis extending generally perpendicular to the longitudinal axis of the T-shaped conduit. The cylindrical portion of the T-shaped conduit is connectable to an end of an adjacent conduit to permit passage of light between the lumens of the adjacent conduit and the T-shaped conduit. The T-shaped conduit has a mirror reflector 28 pivotally mounted in the lumen of the T-shaped conduit. The mirror reflector of the T-shaped conduit is positioned adjacent the opening of the T-shaped conduit. The mirror reflector of the T-shaped conduit has a light reflective surface 29 facing the opening of the T-shaped conduit. In use, the mirror reflector of the T-shaped conduit is pivotable between a first and second angled positions 30,31. In use, the mirror reflector of the T-shaped conduit may be pivoted by a user manually under a chain system like the shade portion of the fixture conduit or electrical by a servo 32 mounted to the mirror reflector. In use, the light reflective surface of the mirror reflector of the T-shaped conduit faces in a direction towards one end of the T-shaped conduit when the mirror reflector of the T-shaped conduit is in the first angled position. Similarly, in use, the light reflective surface of the mirror reflector of the T-shaped conduit faces in a direction towards another end of the T-shaped conduit when the mirror reflector of the T-shaped conduit is in the second angled position. Preferably, light reflective surface of the mirror reflector of the T-shaped conduit generally lies at an acute angle to the longitudinal axis of the T-shaped conduit when the mirror reflector of the T-shaped conduit is in the first position and in the second position. Ideally, the acute angles of the first and second positions of the mirror reflector of the T-shaped conduit are each about 45 degrees.

Figure 3:
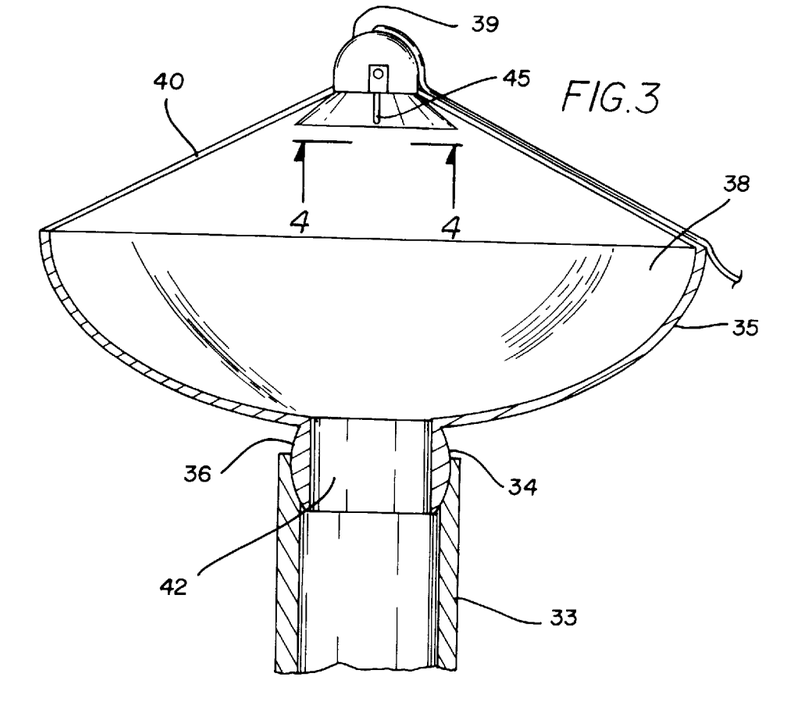
FIG. 3 is a schematic cross sectional view of the region around the reflecting dish of the present invention.
Figure 8:
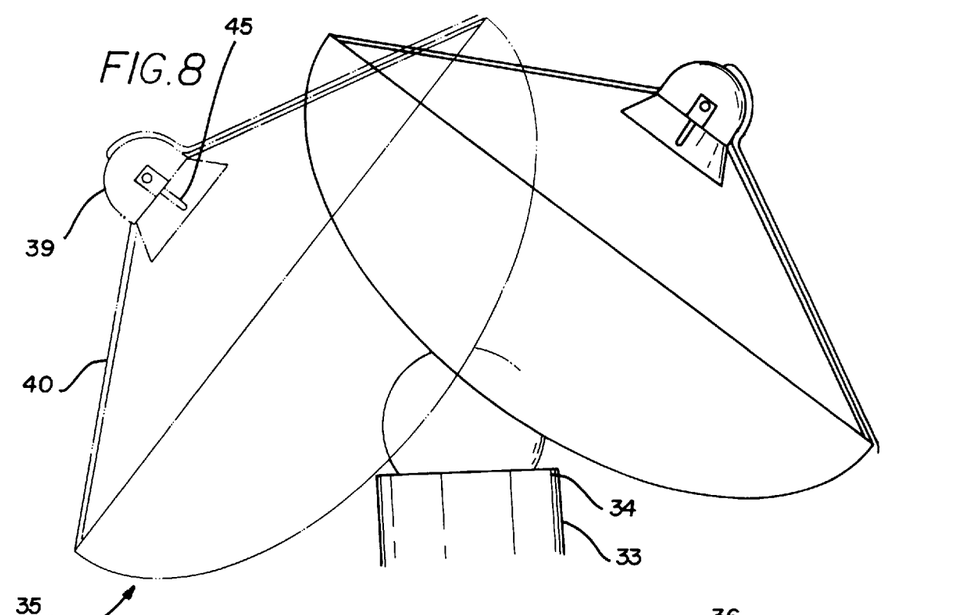
FIG. 8 is a schematic side view illustrating the pivoting of the reflecting dish of the present invention.
Figure 9:
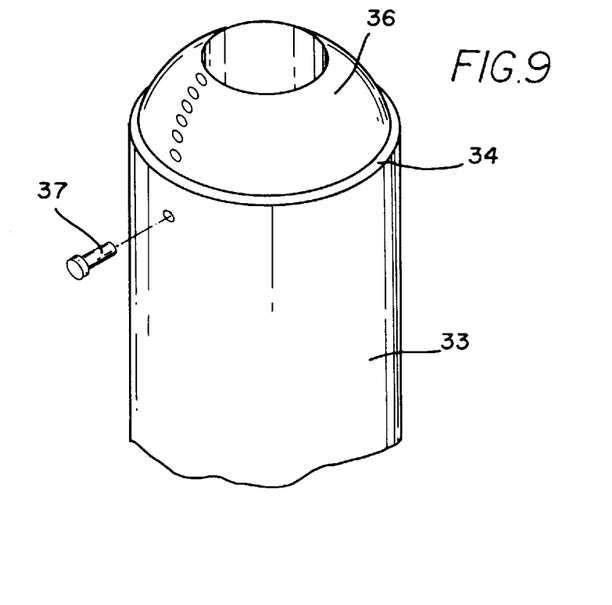
FIG. 9 is a schematic exploded perspective view of the outer end of the terminal conduit of the present invention.

With reference to FIGS. 3, 8, and 9, the conduits also include a terminal conduit 33 having an outer end 34 adapted for extending outside of the building structure. A parabolic reflecting dish 35 is rotatably mounted to the outer end of the terminal conduit by a universal pivot ball 36 inserted into a corresponding socket in the outer end of the terminal conduit to permit 360 pivoting of the reflecting dish. The pivot mount of the reflecting dish preferably has a lock pin 37 insertable through a hole in the terminal conduit and one of a set of holes in the pivot ball to hold the reflecting dish at a fixed position with respect to the outer end of the terminal conduit. The reflecting dish has a parabolic concave light reflecting surface 38 for reflecting sunlight to a focal point.

Figure 4:
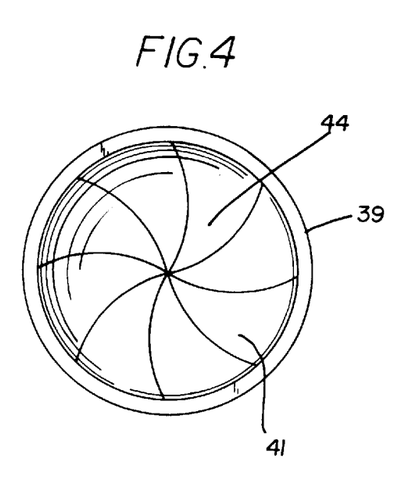
FIG. 4 is a schematic bottom side view of the iris structure in a closed position taken from line 4—4 of FIG. 3.
Figure 5:
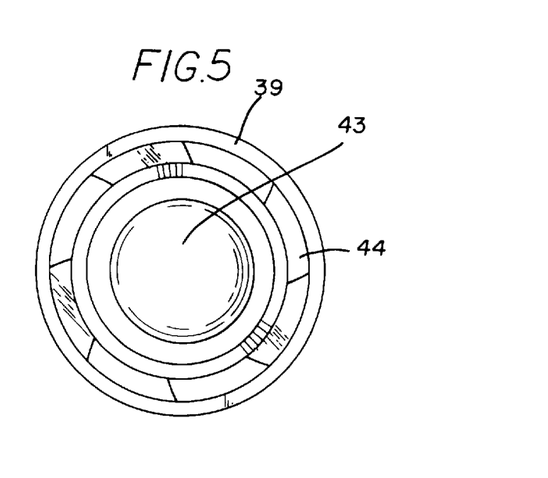
FIG. 5 is a schematic bottom side view of the top reflector with the iris structure open to expose the light source.

As illustrated in FIGS. 3, 4 and 5, a top reflector 39 is supported above the light reflecting surface of the reflecting dish by support arms 40. The top reflector has a concave light reflecting surface 41 facing the light reflecting surface of the reflecting dish. The light reflecting surface of the top reflector is located at the focal point for reflecting light reflected from the light reflecting surface of the reflecting dish back towards a center point on the light reflecting surface of the reflecting dish. The reflecting dish has an opening 42 therethrough into the outer end of the terminal conduit. The opening of the reflecting dish is positioned at the center portion to permit light reflected by the light reflecting surface of the top reflector to pass into the lumen the terminal conduit and thereby into the lumens of the other conduits.

With reference to FIG. 5, the top reflector has a light source 43 such as a light bulb provided therein. The light reflecting surface of the top reflector ideally comprises an iris structure 44 to permit selective opening and closing of the light reflecting surface to expose the light source in the top reflector to shine light into the opening of the reflecting dish. The top reflector preferably has a device for opening and closing the iris structure. The device includes a light sensor 45 for detecting when light reflected by the light reflective surface of the reflecting dish to the focal point is below a predetermined amount. In use, the device opens the iris structure when the light sensor detects light below the predetermined amount (i.e., low sunlight conditions) to let light from the light source to shine into the terminal conduit. Conversely, the device closes the iris structure when the light sensor detects light above the predetermined amount (i.e., in high sunlight conditions).

In use, sunlight is reflected by the reflecting dish and the top reflector into lumens the conduits into the building structure where the light then exits the conduits through the translucent or transparent lower portions of the fixture conduits to provide light in the building structure. In low light conditions, the iris structure opens to let the light source shine light into the conduits so that the inside of the building structure is provided with light by the system.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A lighting system for providing lighting in a building structure, said lighting system comprising:

a plurality of interconnected elongate tubular conduits adapted for mounting inside a building structure, each of said conduits having a lumen in communication with the lumens of the other conduits to permit passage of light between said lumens of said conduits;

each conduit having a longitudinal axis;

said conduits including a plurality of fixture conduits;

each of said fixture conduits comprising spaced apart and generally concentric inner and outer sleeves, said inner sleeve of each fixture conduit defining said lumen of said fixture conduit;

said inner and outer sleeves of each of said fixture conduits having upper and lower portions;

said lower portions of said inner and outer sleeves each comprising a translucent material to permit passage of light in said lumen of the respective conduit through said lower portions of said inner and outer sleeves;

said conduits including a terminal conduit having an outer end adapted for extending outside of the building structure;

a parabolic reflecting dish being rotatably mounted to the outer end of said terminal conduit;

said reflecting dish having a parabolic concave light reflecting surface for reflecting sunlight to a focal point;

a top reflector being supported above said light reflecting surface of said reflecting dish;

said top reflector having a concave light reflecting surface facing said light reflecting surface of said reflecting dish, said light reflecting surface of said top reflector being located at said focal point for reflecting light towards a center point on said light reflecting surface of said reflecting dish; and said reflecting dish having an opening therethrough into said outer end of said terminal conduit, said opening of said reflecting dish being positioned at said center portion to permit light reflected by said light reflecting surface of said top reflector to pass into the lumen said terminal conduit.

2. The lighting system of claim 1, wherein each of said conduits has a light reflecting inner surface defining the lumen of the respective conduit.

3. The lighting system of claim 1, wherein said lower portions of said inner and outer sleeves each comprise a generally transparent material.

4. The lighting system of claim 1, wherein each of said fixture conduits has a shade portion provided between said upper and lower portions of the respective fixture conduit, said shade portion having a generally semi-circular transverse cross section generally perpendicular to the longitudinal axis of the respective fixture conduit.

5. The lighting system of claim 4, wherein said shade portion is positionable between an open position and a closed position, wherein said shade portion is positioned between said upper portions of said inner and outer sleeves when said shade portion is in said open position to permit passage of light from said lumen of the respective fixture portion through said lower portions of said inner and outer sleeves, and wherein said shade portion is positioned between said lower portions of said inner and outer sleeves when said shade portion is in said closed position to substantially block passage of light from said lumen of the respective fixture portion through said lower portions of said inner and outer sleeves.

6. The lighting system of claim 5, wherein each fixture conduit has a pull chain coupled to said shade portion and downwardly depending from the respective fixture conduit, said pull chain permitting positioning of said shade portion between said open and closed positions.

7. The lighting system of claim 1, wherein said conduits include an elbow conduit, said elbow conduit having an opening at an end of said elbow conduit generally lying in a plane generally parallel to said longitudinal axis of said elbow conduit, said opening of said elbow conduit being connectable to an end of an adjacent conduit to permit passage of light between the lumens of the adjacent conduit and said elbow conduit.

8. The lighting system of claim 7, wherein said elbow conduit includes a mirror reflector adjacent said opening of said elbow conduit, said mirror reflector having a light reflecting surface facing into said lumen of said elbow conduit said mirror reflector generally lying in a plane extending at an acute angle to said longitudinal axis of said elbow conduit, wherein said acute angle of said mirror reflector is about 45 degrees, said mirror reflector reflecting light passing through said opening of said elbow conduit through said lumen of said elbow conduit.

9. The lighting system of claim 1, wherein said conduits include a T-shaped conduit having an opening between pair of opposite ends of said T-shaped conduit, said opening of said T-shaped conduit generally lying in a plane parallel to said longitudinal axis of said T-shaped conduit, said T-shaped conduit having a generally cylindrical portion outwardly extending from said opening of said T-shaped conduit, said cylindrical portion of said T-shaped conduit having a longitudinal axis extending generally perpendicular to said longitudinal axis of said T-shaped conduit, said cylindrical portion of said T-shaped conduit being connectable to an end of an adjacent conduit to permit passage of light between the lumens of the adjacent conduit and said T-shaped conduit.

10. The lighting system of claim 9, wherein said T-shaped conduit has a mirror reflector pivotally mounted in said lumen of said T-shaped conduit, said mirror reflector of said T-shaped conduit being positioned adjacent said opening of said T-shaped conduit, said mirror reflector of said T-shaped conduit having a light reflective surface facing said opening of said T-shaped conduit, said mirror reflector of said T-shaped conduit being pivotable between a first and second angled positions, wherein said light reflective surface of said mirror reflector of said T-shaped conduit faces in a direction towards one end of said T-shaped conduit when said mirror reflector of said T-shaped conduit is in said first angled position, and wherein said light reflective surface of said mirror reflector of said T-shaped conduit faces in a direction towards another end of said T-shaped conduit when said mirror reflector of said T-shaped conduit is in said second angled position.

11. The lighting system of claim 1, wherein said top reflector has a light source provided therein, wherein said light reflecting surface of said top reflector comprises an iris structure to permit selective opening and closing of said light reflecting surface to expose said light source in said top reflector to shine light into said opening of said reflecting dish.

12. A lighting system for providing lighting in a building structure, said lighting system comprising:

a plurality of interconnected elongate tubular conduits adapted for mounting inside a building structure, each of said conduits having a lumen in communication with the lumens of the other conduits to permit passage of light between said lumens of said conduits;

each conduit having a longitudinal axis and a generally circular transverse cross section generally perpendicular to said longitudinal axis of the respective fixture conduit;

each of said conduits having a light reflecting inner surface defining the lumen of the respective conduit;

said conduits including a plurality of fixture conduits;

each of said fixture conduits comprising spaced apart and generally concentric inner and outer sleeves, said inner sleeve of each fixture conduit defining a lumen;

each of said fixture conduits having a pair of opposite open ends providing openings into said lumen of the respective fixture conduit;

said inner and outer sleeves of each of said fixture conduits having upper and lower portions, said upper and lower portions of said inner and outer sleeves each having a generally semi-circular transverse cross section generally perpendicular to the associated longitudinal axis of the respective fixture conduit;

said lower portions of said inner and outer sleeves each comprising a translucent material to permit passage of light in said lumen of the respective conduit through said lower portions of said inner and outer sleeves, wherein said lower portions of said inner and outer sleeves each comprise a generally transparent material;

each of said fixture conduits having a shade portion provided between said upper and lower portions of the respective fixture conduit, said shade portion having a generally semi-circular transverse cross section generally perpendicular to the longitudinal axis of the respective fixture conduit;

said shade portion being positionable between an open position and a closed position;

wherein said shade portion is positioned between said upper portions of said inner and outer sleeves when said shade portion is in said open position to permit passage of light from said lumen of the respective fixture portion through said lower portions of said inner and outer sleeves;

wherein said shade portion is positioned between said lower portions of said inner and outer sleeves when said shade portion is in said closed position to substantially block passage of light from said lumen of the respective fixture portion through said lower portions of said inner and outer sleeves;

wherein each fixture conduit has a pull chain coupled to said shade portion and downwardly depending from the respective fixture conduit, said pull chain permitting positioning of said shade portion between said open and closed positions;

said conduits including an elbow conduit, said elbow conduit having an opening at an end of said elbow conduit generally lying in a plane generally parallel to said longitudinal axis of said elbow conduit, said opening of said elbow conduit being connectable to an end of an adjacent conduit to permit passage of light between the lumens of the adjacent conduit and said elbow conduit;

said elbow conduit including a mirror reflector adjacent said opening of said elbow conduit, said mirror reflector having a light reflecting surface facing into said lumen of said elbow conduit said mirror reflector generally lying in a plane extending at an acute angle to said longitudinal axis of said elbow conduit, wherein said acute angle of said mirror reflector is about 45 degrees, said mirror reflector reflecting light passing through said opening of said elbow conduit through said lumen of said elbow conduit;

said conduits including a T-shaped conduit having an opening between pair of opposite ends of said T-shaped conduit, said opening of said T-shaped conduit generally lying in a plane parallel to said longitudinal axis of said T-shaped conduit;

said T-shaped conduit having a generally cylindrical portion outwardly extending from said opening of said T-shaped conduit, said cylindrical portion of said T-shaped conduit having a longitudinal axis extending generally perpendicular to said longitudinal axis of said T-shaped conduit, said cylindrical portion of said T-shaped conduit being connectable to an end of an adjacent conduit to permit passage of light between the lumens of the adjacent conduit and said T-shaped conduit;

said T-shaped conduit having a mirror reflector pivotally mounted in said lumen of said T-shaped conduit, said mirror reflector of said T-shaped conduit being positioned adjacent said opening of said T-shaped conduit, said mirror reflector of said T-shaped conduit having a light reflective surface facing said opening of said T-shaped conduit;

said mirror reflector of said T-shaped conduit being pivotable between a first and second angled positions;

wherein said light reflective surface of said mirror reflector of said T-shaped conduit faces in a direction towards one end of said T-shaped conduit when said mirror reflector of said T-shaped conduit is in said first angled position;

wherein said light reflective surface of said mirror reflector of said T-shaped conduit faces in a direction towards another end of said T-shaped conduit when said mirror reflector of said T-shaped conduit is in said second angled position;

wherein light reflective surface of said mirror reflector of said T-shaped conduit generally lies at an acute angle to said longitudinal axis of said T-shaped conduit when said mirror reflector of said T-shaped conduit is in said first position and in said second position, wherein said acute angles of said first and second positions of said mirror reflector of said T-shaped conduit are each about 45 degrees;

said conduits including a terminal conduit having an outer end adapted for extending outside of the building structure;

a parabolic reflecting dish being rotatably mounted to the outer end of said terminal conduit;

said reflecting dish having a parabolic concave light reflecting surface for reflecting sunlight to a focal point;

a top reflector being supported above said light reflecting surface of said reflecting dish;

said top reflector having a concave light reflecting surface facing said light reflecting surface of said reflecting dish, said light reflecting surface of said top reflector being located at said focal point for reflecting light towards a center point on said light reflecting surface of said reflecting dish;

said reflecting dish having an opening therethrough into said outer end of said terminal conduit, said opening of said reflecting dish being positioned at said center portion to permit light reflected by said light reflecting surface of said top reflector to pass into the lumen said terminal conduit;

said top reflector having a light source provided therein;

said light reflecting surface of said top reflector comprising an iris structure to permit selective opening and closing of said light reflecting surface to expose said light source in said top reflector to shine light into said opening of said reflecting dish; and said top reflector having a device for opening and closing said iris structure, said device including a light sensor for detecting when light reflected by said light reflective surface of said reflecting dish to said focal point is below a predetermined amount, wherein said device opens said iris structure when said light sensor detects light below said predetermined amount, wherein said device closes said iris structure when said light sensor detects light above said predetermined amount.

* * * * *